May 25, 1965 YVES-JEAN F. BRETTE ETAL 3,185,971

DOUBLE MAGNETIC HEAD

Filed May 3, 1961

5 Sheets-Sheet 1

Inventors:
Yves-Jean François Brette
and
Jacques Pierre Léon Droux
BY Baldwin & Wight
attorneys

DOUBLE MAGNETIC HEAD

Filed May 3, 1961

Inventors:
Yves-Jean François Brette
and
Jacques Pierre Léon Droux
By Baldwin & Wight
Attorneys May 25, 1965 YVES-JEAN F. BRETTE ETAL 3,185,971

DOUBLE MAGNETIC HEAD

Filed May 3, 1961 5 Sheets-Sheet 3

Inventors:
Yves-Jean François Brette
and
Jacques Pierre Léon Drouet
By Baldwin & Wight
Attorneys Inventors:
Yves-Jean François Brette
and
Jacques Pierre Léon Droup
BY Baldwin & Wight
Attorneys Inventors:
Yves-Jean François Brette
and
Jacques Pierre Léon Droux
BY Baldwin & Wight
Attorneys 3,185,971
DOUBLE MAGNETIC HEAD
Yves-Jean Francois Brette, Sevres, and Jacques Pierre Léon Droux, Paris, France, assignors to Compagnie des Machines Bull (Societe Anonyme), Paris, France
Filed May 3, 1961, Ser. No. 107,428
Claims priority, application France, May 25, 1960, 828,219, Patent 1,265,942
6 Claims. (Cl. 340—174.1)

Figure 7:
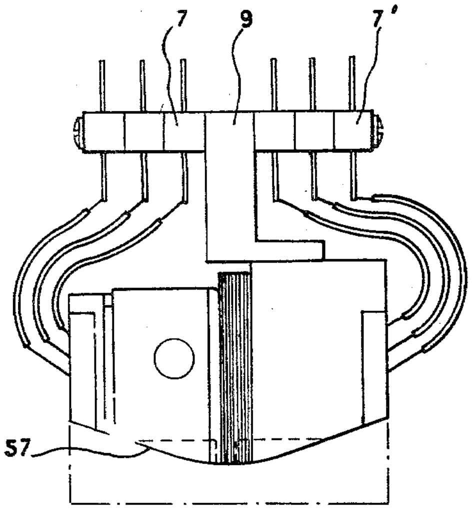

This invention relates to a double magnetic head by means of which information can be recorded on and read from a multiple-track magnetic recording medium.

It is current practice to record binary data on a magnetic tape consisting of a magnetisable magnetic film deposited on a non-magnetic support, for example a support of plastic, and to dispose a number of recording tracks parallel to the direction of travel. The recording head therefore comprises an assembly of transducer elements disposed laterally in relation to the direction of travel of the tape, each element effecting the recording on one track. If the position of the elements in relation to one another is sufficiently accurate, an electric signal sent simultaneously to the transducer elements produces a variation of the magnetic state on each track along positions aligned perpendicularly to the travel, so that an assembly of transducer elements constituting a reading head disposed parallel to the recording head at some distance from the latter makes it possible to pick up an induced signal simultaneously at each transducer.

If a signal representing a binary digit is sent to each recording transducer, such that the assembly of the signals simultaneously sent to each track represents the coded binary combination representative of a character, the signal induced in the reading head reconstitutes the corresponding coded character. In this application, the magnetic surface state is varied betwen two opposite values in accordance with the hysteresis loop of the material, one corresponding to the binary digit 1 and the other to the binary digit 0. Various recording and reading systems may be employed, depending upon whether the "return to zero" method of recording or the "non-return to zero" method is employed for the recording of series of 0's and 1's. Methods called "phase modulation" methods, in which the differentiation between the 0's and the 1's is provided, not by the polarity of the signal, but by its phase at the frequency under consideration, are also employed.

In addition, the recording is characterised by the density of the items of information along one track, defined by the number of changes of states per unit of length, which depends upon the characteristics of the recording circuits and upon the speed of travel of the tape. This datum is preponderant for the determination of the characteristics of the magnetic head.

The items of information to be recorded are generally grouped in units of information of constant length or words, the words being themselves distributed in blocks of constant or variable length. The blocks are separated from one another by spaces containing no information, which may be utilized for stopping and starting the tape driving device.

In order to ensure accuracy of the recording effected, it is necessary to read after the recording the datum which has been written, since various causes of disturbance may subsist despite all the precautions taken (such as magnetic dust due to wear of the tape, faulty travel resulting in the tape becoming skew in relation to the head, . . .). The checking of the recording may consist in a checking of the parity key of the character read, or more effectively in a comparison of the coded character read with the recorded coded character which is kept in store. In order to achieve this, it is therefore desirable to position the reading head as close as possible to the recording head in order to detect any error in the minimum period of time, and also in order to take account of the minimum time of the manipulations for stopping the running of the tape driving device, each recorded character having to be verified.

Difficulties are encountered in thus positioning the recording head and the reading head close together and in simultaneously effecting a recording and a reading, mainly by reason of the crosstalk. The signal received at a reading transducer element when a signal of like phase is recorded on the various recording transducer elements is called the writing-reading crosstalk signal. The cross-talk may be expressed in decibels by the ratio to the crosstalk signal of the signal obtained in a true reading, after a recording made from a writing signal of like strength on the corresponding recording channel. In order to eliminate this crosstalk, it is therefore desirable that one head should be magnetically insulated from the other without increasing the distance between the heads beyond predetermined limits.

The second type of crosstalk to be eliminated is due to the juxtaposition of transducer elements for the simultaneous recording or reading of a number of channels. Lateral crosstalk is defined by the ratio in decibels between the signal received at a reading transducer element corresponding to an unrecorded channel, all the other channels having been recorded on, and the reading signal obtained at the same transducer after the effective recording on this channel, the writing transducer elements employed all receiving a signal of like strength. It is shown experimentally that the lateral crosstalk signal is for the greater part caused by a parasitic recording due to a direct induction from one transducer element to another, the non-energized writing transducer thus producing, owing to this induced field, a parasitic recording of lower level, which is in turn read by the reading head. To this form of crosstalk is added the crosstalk due to mutual influence of the reading channels. These forms of crosstalk are eliminated by magnetically insulating one trandsucer element from the adjacent elements, which involves the difficulty that the distance between two elements is limited by the distance between two tracks on the magnetic recording medium.

In accordance with the invention, there is provided a double magnetic head for recording and reading information on a multiple-track magnetic recording medium, comprising as many superposed recording transducer elements as there are tracks in the medium, a same quantity of superposed reading transducer elements, each recording or reading transducer element consisting of a core formed of two asymmetrical parts, one of which is U-shaped and carries one or two windings in its rectilinear portions, while the other is a rectangular member, these two parts forming between them a non-magnetic air gap, all the recording transducer elements on the one hand and all the reading transducer elements on the other hand being so superposed that the air gaps between recording transducer elements are absolutely aligned in their production, and that the planes of the reading and recording air gaps are absolutely parallel, the assembly of all the reading transducer elements and the assembly of all the recording transducer elements being rigidly maintained in a non-magnetic casing.

Figure 1:
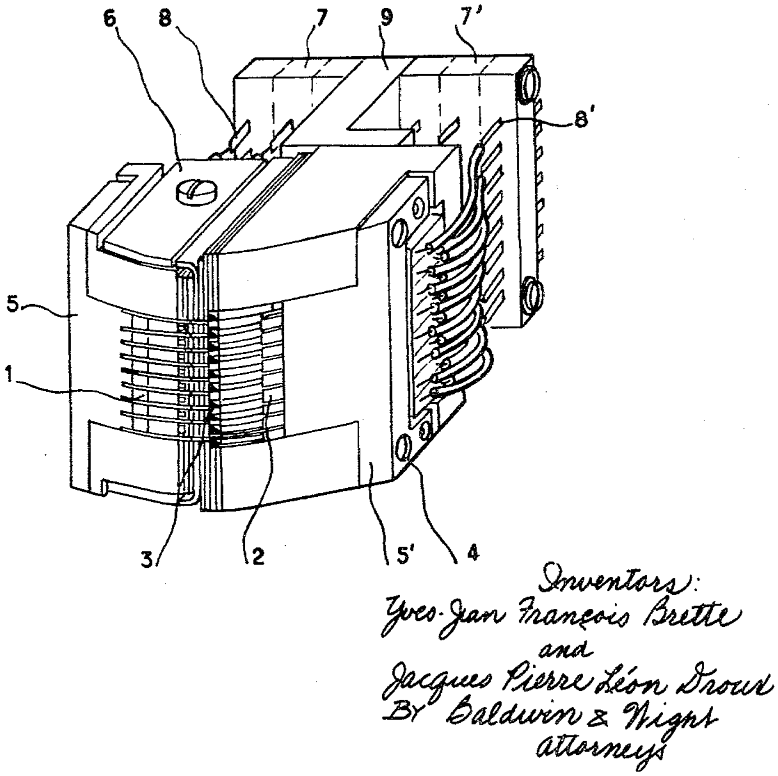
Figure 2:
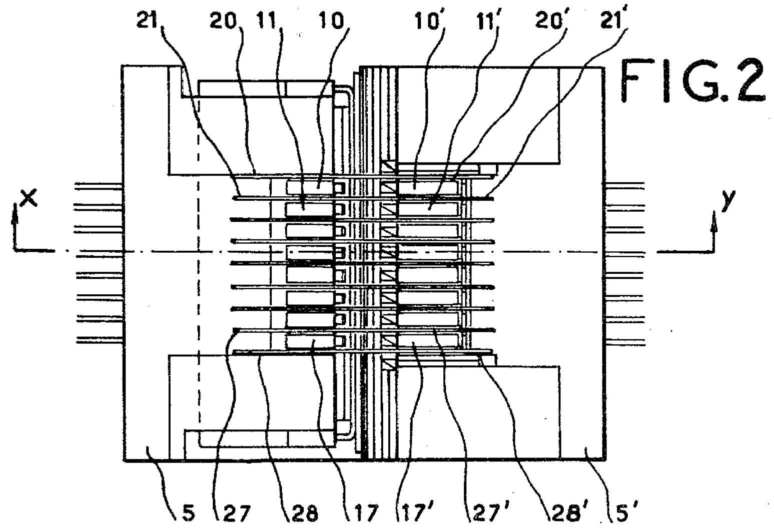
Figure 3:
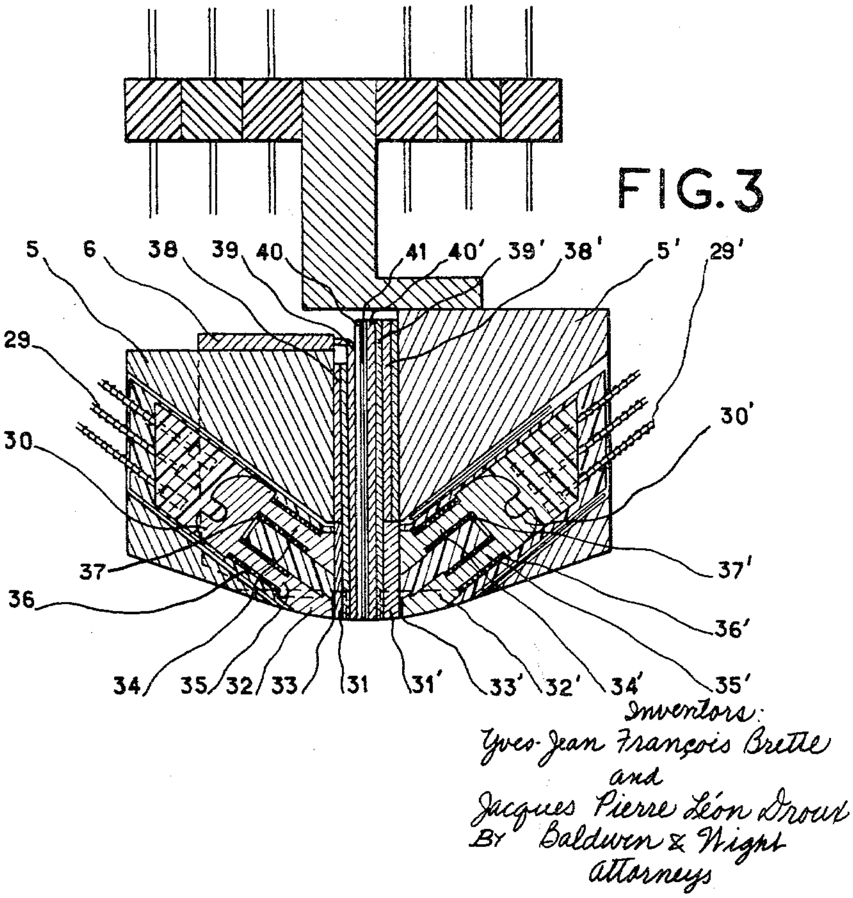

For a better understanding of the invention and the manner in which it is to be performed, the same will now be described, by way of example, with reference to the accompanying drawings, in which:

FIGURE 1 is a perspective view of a double magnetic head according to an embodiment of the invention, FIGURE 2 is a view from below of the head showing the superposition of the transducers, FIGURE 3 is a sectional view of the head along the plane $x$–$y$ indicated in FIGURE 2, FIGURE 4 (comprising FIGURES 4A to 4E) shows the constitution of a transducer element, FIGURE 5 (comprising FIGURES 5A to 5D) shows the assembly of the transducer elements in the brass casing before machining, FIGURE 6 (comprising FIGURES 6A and 6B) shows the constitution of the central portion of the head, and FIGURE 7 shows the machining operation by which the head is brought into its final form.

The overall structure of the double head is illustrated in FIGURE 1, there being a recording section 1 and a reading section 2 which, for the sake of convenience, will be called the recording head and the reading head. The recording head and reading head are separated by a set of shields 3 which are hereinafter more fully described and which are maintained in relation to one another by brass assembly rods 4 within a brass casing 5, 5'.

The recording head 1 is in addition covered on three side by a stirrup-shaped shield 6 which is of high-permeability magnetic material such as mumetal and which forms an extension of the shield of the same metal of the central portion, so as to enclose the head 1 and to prevent dispersion of stray flux outside the recording head.

The upper part of the double head comprises two connecting supports 7 and 7' of insulating material which carry lugs 8, 8' connected to the lead-out wires of the windings. These supports are in turn mounted on a right-angled member 9 formed of brass and fixed to the brass casing 5'.

FIGURE 2 illustrates a plan view of the head, showing the various transducer elements 10 to 17 (recording head) and 10' to 17' (reading head), maintained in the brass casing 5, 5' and separated from one another by shields 20 to 28 (recording side) and 20' to 28' (reading side), the shields 20, 28 and 20', 28' separating the extreme transducer elements from the brass casing. The construction of these shields and that of the shields separating the two heads will hereinafter be described.

FIGURE 3 is a sectional view of the head along the plane $x$–$y$ indicated in FIGURE 2, through a recording transducer head and a reading transducer head in their active portions. As will be seen from FIGURE 3, the magnetic cores 30 and 30' of high-permeability material consist of a first portion 31, 31' of rectangular form, and of a second portion 32, 32' of specially designed shape comprising legs 34 and 35 (and 34' and 35') on which are wound the exciter coils 36 and 37 and the receiving coils 36' and 37', which may be externally connected in series or in parallel by the lead-out wires 29 and 29', according to requirements.

The lower portion of the members 31 and 32 on the one hand and 31' and 32' on the other hand form between them a non-magnetic air gap 33, 33' of which the width of several tens of microns is determined by a distance piece of non-magnetic material, such as silver. The air gap width is not necessarily identical in all the recording and reading heads, but depends upon the data of the external circuits and of the methods of use.

There will also be seen in FIGURE 3, the brass casing 5 (recording side), 5' (reading side) and the outer shield 6. In the central portion, the succession of shields ensuring both electrical and magnetic insulation of the recording and reading heads from one another is as follows:

At 38, a non-magnetic shield formed of a conductive metal such as silver, with the let-in member 31, At 39, a shield of mumetal joined externally to the stirrup-shaped shield 6, At 40, a silver shield, At 41, a thickness of insulating paper for completing the electrical insulation, and Symmetrically in relation to the reducing side, a conductive shield 40', a shield 39' of magnetic material and a shield 38' with the let-in member 31'.

This arrangement of the central shields is given only by way of example. It will be appreciated that there is thus provided, with small dimensions, a stack of alternately conductive and magnetic laminations in order to concentrate the magnetic and electrical leakage lines and to prevent interaction of one transducer element with another.

It is also to be noted that the form given to the magnetic circuit of the transducer elements is asymmetrical in relation to the plane of the air gap, so as to preserve every winding facility despite the very short distance between the two recording and reading transducer elements. This arrangement also contributed to reducing the possibilities of induction from one coil to the other.

The magnetic core whose section is shown in FIGURE 3 is formed of a stack of thin laminations of magnetic material. Each transducer is separately constructed and receives its own winding, but it does not have its final shape from the very beginning. It has in fact been indicated at the beginning of this description, the importance which is attached to the alignment of the air gaps of the transducers of the various channels in order not to introduce any errors of interpretation of characters. The complete construction of the transducers independently from one another, with careful trueing of each air gap, followed by the arrangement of the elements in the casings with microscopic checking of the alignment, appears to be a very lengthy, costly and delicate method of production.

It is therefore now proposed to give a number of details regarding the method of production by which the desired mechanical performances can be obtained with absolute certainty. This description will also define the nature and the shape of the spare parts employed, while showing their function in the protection against the various forms of crosstalk or in the production of the desired characteristics.

It will first of all be noted that, in contradistinction to certain constructions, no recesses have been provided in the brass casing for the positioning of each transducer element so that the thickness of the tracks and of the tape between the tracks may be available without restriction and the structures may be so composed as to improve their resistance to wear and to increase the effectiveness of the shields. Strict inspection of the spare parts and precision in the assembly operations eliminate all deviations in the positioning of the transducers.

Each magnetic core consists of a stack of laminations of high-permeability material, for example mumetal. The thickness of this circuit at the level of the poles constitutes the width of the signal recorded or read. In one embodiment of the invention, this width is, by way of example, 8/10 mm. in recording and 5/10 mm. in reading. The reading width is slightly narrower in order to avoid the introduction of any reading error in the event of slight displacements of the tape in the lateral direction. The first step in the production is illustrated in FIGURE 4 and concerns the stacking of laminations intended for producing the magnetic circuit 32. The original form of this circuit is that of FIGURE 4B, consisting of the superposition of parts having the shape 42 and of parts having the shape 43, so as to produce the thickness of the winding in the upper portion, as shown in side elevation in FIGURE 4C. The number of parts 42 and 43 is variable in accordance with the thickness of the magnetic circuit and the thickness chosen for the laminations.

Externally of the magnetic circuit, two laminations 44 of non-magnetic material of greater hardness, such as special steels, are attached so as to increase the mechanical properties of the assembly and more especially its wear resistance. The laminations are assembled and then cut out in accordance with FIGURE 4D (form 45), so that the windings can be wound on to the legs 34, 35.

Figure 4A:
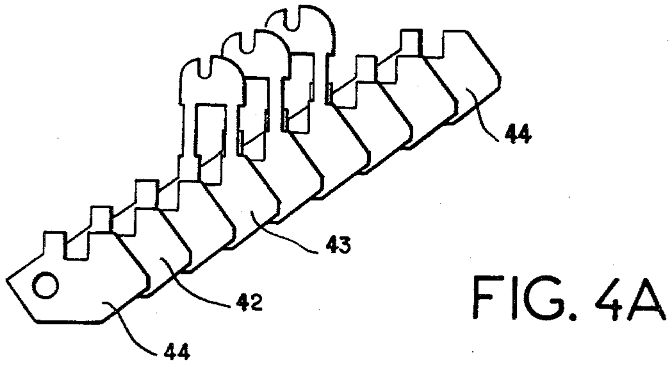
Figure 4B:
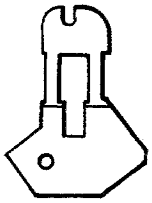
Figure 4C:
Figure 4D:
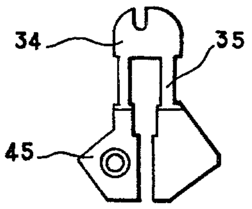
Figure 4E:
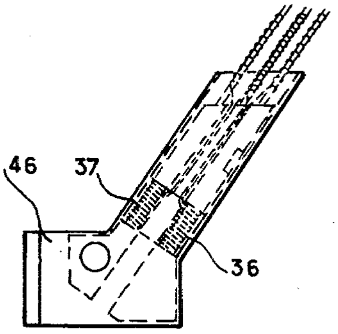
Figure 5A:
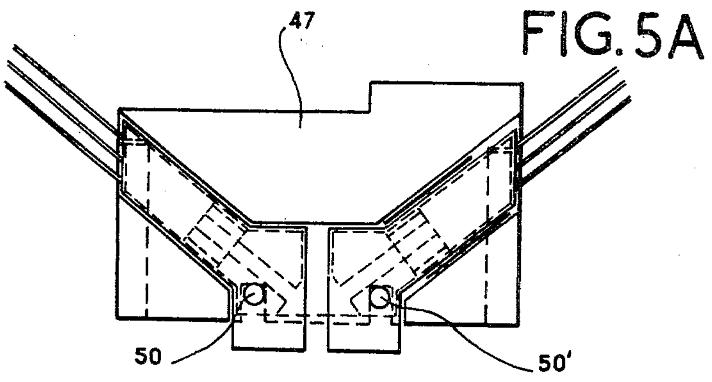
Figures 5B, 5C:
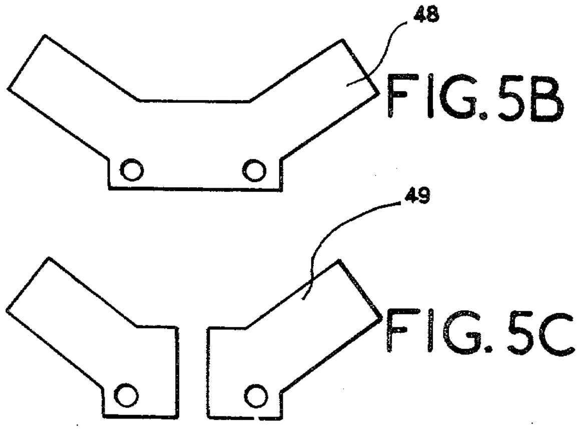

The whole is then moulded in accordance with the form 46 of FIGURE 4E in an appropriate thermosetting resin.

Figure 5D:
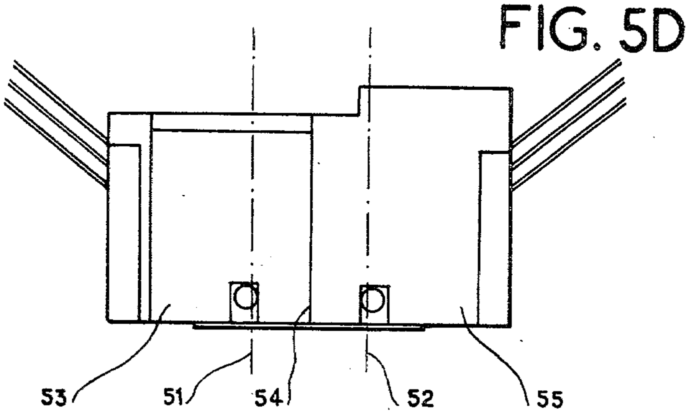
Figure 6A:
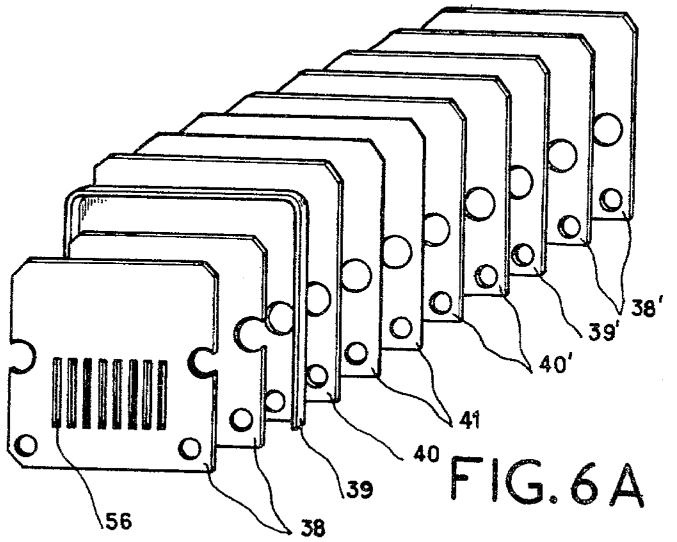
Figure 6B:

In this way, as many reading and recording members are produced as there are tracks, whereafter the stacking is effected in a brass casing 47 in accordance with FIGURE 5. All insulating precautions are taken and the circuits constituting the transducers are separated from one another by shields which have the shape 48 (shield of non-magnetic conductive material) and the shape 49 (shield of magnetic material), each transducer element being separated from the preceding one by a superposition of these shields, for example a shield 49, a shield 48 and a shield 49. The elements are assembled by means of two rods 50 and 50′ extending through all the members, each of which is formed with a hole in the same position. A brass member is employed to close the casing in accordance with FIGURE 5D.

The following operations will therefore concern all of the transducer elements, and all of the machining operations will be common, whereby it is possible to guarantee the mechanical properties of the member, more especially the alignment of the air gaps.

The block just obtained (FIGURE 5D) is severed into three sections by sawing along the planes 51, 52. The central section 54 is not used. Referring to FIGURE 3, the entire circuit 32 is in the section 53, and the entire circuit 32′ in the section 55.

Independently, there is produced a "central block" which carries all the pole pieces 31, 31′ and all the central shields enumerated in the foregoing. This block is illustrated in FIGURE 6. There will be seen more especially the shields 38 and 38′ in the slots 56, in which there are engaged the pole pieces, the shields 39 and 39′, the shield 39 having a curved shape to adapt it to the stirrup-shaped shield 6.

The machining operations on the faces which must be brought together, i.e. the inner face of the section 53, the two faces of the central block and the inner face of the section 55, are carried out with all the precision required to guarantee the quality of the finished head. The air gaps of desired width are formed in the inner faces of 53 and 55. The three parts, i.e. the section 53, the section 55 and the central block, are assembled by means of assembly rods 4. Distance pieces are disposed in the air gaps. The positioning of the sections is checked with great precision, if necessary by means of a microscope. The parallelism of the air gap lines is also verified.

The last operation (FIGURE 7) consists in giving the head its final profile 57, which is most suitable for applying the head to the tape with correct pressure, so as to ensure minimum wear of the surfaces during service (the portion which is removed is shown in dash-dotted lines).

The connection supports 7, 7′ and the right-angled member 9 are the last members to be assembled.

The double head constructed in accordance with these methods possesses good properties of mechanical strength and can be mass-produced with great uniformity of manufacture.

Two arrangements may be adopted in order further to reduce the crosstalk signals between the channels and the writing-reading crosstalk signals.

The first arrangement concerns lateral crosstalk, that is to say, between recording (or reading) transducer elements. Conductive and magnetic shields have already been disposed between the elements during the construction. It has been observed that it is possible to obtain a better elimination of this form of crosstalk by using shields which are integral and not divided into two parts in the production of the air gaps. These shields are not essential over the entire height of the transducer elements, but mainly at the level of the air gaps.

Small mumetal members forming shields are therefore disposed between the transducer elements on the reading side and on the recording side. In order to position them in accordance with FIGURE 7 when the profile has been roughed out, there are traced in the thickness of the shields existing in the structure, and over a small height, slots into which are introduced shields of slightly smaller thickness and stuck in position by means of resin. These shields are shown in chain lines in FIGURE 7 and are visible in FIGURE 2. The ends of the shields are lodged in the numetal shields of the central block (39, 39′). In this way, continuous shields have been disposed between the transducers at the level of the air gaps, thus improving the effectiveness of the magnetic protective circuit, and without impairing the rigidity of the head and the alignment of the air gaps.

The second arrangement concerns the elimination of writing-reading crosstalk. The direct parasitic fluxes between the recording and reading heads are absorbed by the shields disposed between the heads, but there also exists a path of stray lines outside the head between the pole pieces 32 and 32′. The flux collected by the pole piece 32′ of the reading head is considerably reduced by disposing in the path of these stray lines a member forming a shield of magnetic material, which is extended below the reading head by a conductive shield. For example, there are disposed below the tape, perpendicularly thereto and in the extension of the central shields, a number of mumetal plates to which there is fixed a right-angled silver member which creates below the reading head a path of low resistance. The spacing between the said member and the lower face of the tape is not very critical, by reason of which its positioning is facilitated and no additional wear on the tape is produced.

Certain modifications may be introduced into the construction of the magnetic heads without departing from the spirit of the invention. For example, the recording head and the reading head may be constructed independently of one another until the final stage of production, and thereafter the two sets assembled while verifying the parallelism of the air gap lines and the alignment of the transducer elements corresponding to one channel. The form of the magnetic circuits may be modified to the extent that it does not involve any increase of the distances of the air gap lines and is not likely to introduce any additional crosstalk. Likewise, the choice of the materials and of the laminations constituting the stacks of the transducer elements and of the shields may be modified in many ways.

We claim:

1. Apparatus for recording and reading information on a multiple-track magnetic recording medium, comprising as many superposed recording transducer elements as there are tracks in the medium, a same quantity of superposed reading transducer elements, so disposed that the air gaps of the recording transducer elements are absolutely aligned, that the air gaps of the reading transducer elements are also absolutely aligned, and that the two parallel planes extending through the air gap lines perpendicularly to the recording medium are at a very short distance apart, each recording or reading transducer element consisting of a core formed of two parts, of which the first one is U-shaped and comprises unequal legs, each carrying one winding on its rectilinear portion, while the second part is a parallelepipedic member, these two parts forming between them a non-magnetic air gap, two immediately adjacent transducer elements being magnetically and electrically insulated from one another by shields, one of which extends beyond said second core part at the level of the air gaps, while the two assemblies formed of all the recording transducer elements and all the reading transducer elements are in addition separated from one another by a series of plane shields consisting of alternately magnetic and conductive materials.

2. Apparatus according to claim 1, wherein the assembly consisting of all the recording transducer elements and the intermediate shields, all the reading transducer elements and the intermediate shields, and the series of shields disposed between these two assemblies, is rigidly maintained in a non-magnetic casing.

3. Apparatus for recording and reading information on a multiple-track magnetic recording medium, comprising as many superposed recording transducer elements as there are tracks in the medium, a same quantity of superposed reading transducer elements, a non-magnetic casing each recording or reading transducer element consisting of a core formed of two parts, the first one is of asymmetrical U-shape and is obtained by the superposition of thin laminations comprised of magnetic material and of non-magnetic material of great hardness, and carries on its rectilinear portions two windings, while the second core part is a rectilinear member, these two parts forming between them a non-magnetic air gap, all the recording transducer elements on the one hand and all the reading transducer elements on the other hand being superposed, and the air gaps being simultaneously produced, so that all the air gaps of the recording transducer elements are accurately aligned, while all the air gaps of the reading transducer elements are accurately aligned parallel to the first-mentioned air gaps, the two head assemblies being rigidly maintained in said non-magnetic casing.

4. Apparatus for recording and reading information on a multiple-track magnetic recording medium, comprising as many superposed recording transducer elements as there are tracks in the medium, a same quantity of superposed reading transducer elements, each recording or reading transducer element consisting of a core formed of two parts, of which the first one is of asymmetrical U-shape and is obtained by the superposition of thin laminations alternately of magnetic material and of non-magnetic material of great hardness, and carries on its rectilinear portions two windings, and the other of which is a rectangular member, the said two parts forming between them a non-magnetic air gap, each recording or reading transducer element being in addition electrically and magnetically insulated from the recording or reading transducer element closest thereto by shields, one of which of magnetic material, overlaps the end portions of both said core parts at the level of the air gaps, the assembly consisting of all the recording transducer elements and all the reading transducer elements being assembled and treated in such manner that the air gaps of the transducer elements are accurately aligned, the plane of the air gaps of the reading transducer elements being parallel to the plane of the air gaps of the recording transducer elements, and the two assemblies being rigidly maintained in a non-magnetic casing.

5. Multiple magnetic head unit comprising a plurality of adjacently stacked transducing heads, each head being composed of two generally flat core parts, a first core part being parallelipipedic in form, the second core part substantially in form of an asymmetric U, the axis of which is oriented obliquely with respect to the length of said first core part, and being fitted with two legs, one of which engages said first core part, and the other is adapted to define a non-magnetic gap with said first core part, one winding being wrapped on each of said legs; a first flat member of conductive material having slots for housing said first core parts in proper spacing; a second flat member of conductive material, one surface of which constitutes an abutting face for all said first core parts; and an assembly casing of conductive material with means to maintain all said second core parts in contact with said first and second flat members.

6. Magnetic head unit as claimed in claim 5, wherein electrostatic and electromagnetic shielding between adjacent heads is provided by alternate highly conductive and highly permeable thin laminations, and comprising between each pair of adjacent heads a magnetic shield of high permeability formed to overlap the end portions of said first and second core parts substantially on the height of said gap.

References Cited by the Examiner

UNITED STATES PATENTS 2,922,231 1/60 Witt et al. ----------- 340—174.1

IRVING L. SRAGOW, *Primary Examiner.*